3,431,442
MINIATURE ELECTRIC MOTOR WITH DIELECTRIC COVER PLATE HAVING BRUSH HOLDERS
Takaichi Mabuchi, No. 262, Honden-machi, Katsushika-ku, Tokyo, Japan
Filed Oct. 1, 1965, Ser. No. 491,982
Claims priority, application Japan, Dec. 9, 1964, 39/68,835
U.S. Cl. 310—42   10 Claims
Int. Cl. H02k 15/00, 13/00; H01r 39/40

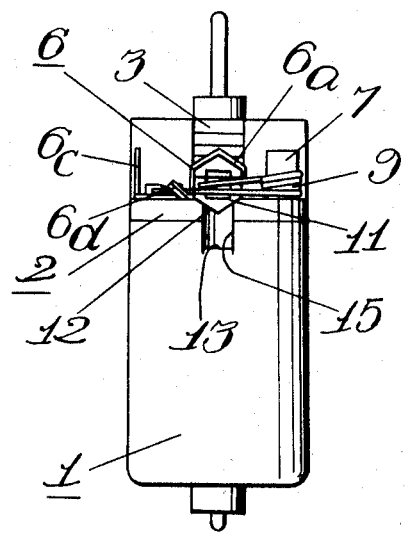
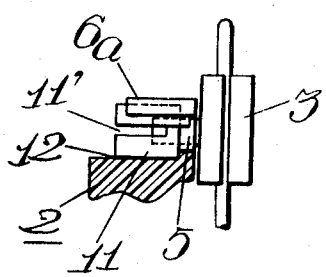
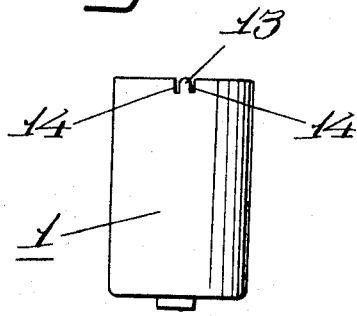
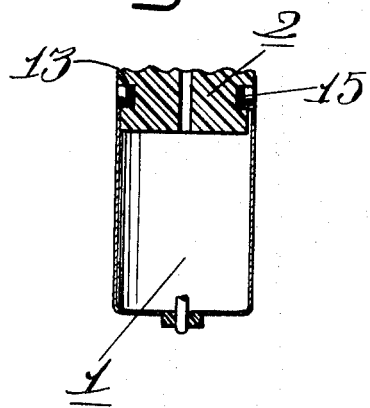
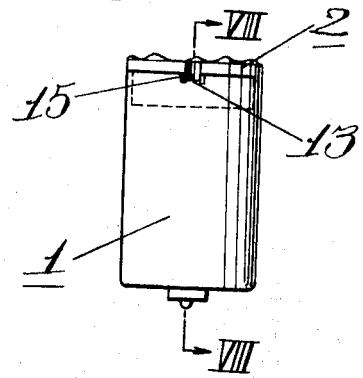

ABSTRACT OF THE DISCLOSURE

A miniature electric motor includes a casing having an open end and formed to rotatably receive an armature shaft. A dielectric cover plate fits in the open end of the casing and is formed with a bearing rotatably supporting the armature shaft with a commutator on the shaft extending axially outwardly of the cover plate. The cover plate has a pair of rectilinear guide means extending radially toward the bearing, and each slidably guiding a respective carbon brush. Each brush has electrically conductive plate means in extended surface engagement with a lateral surface of the brush. Respective torsion springs engage the radially outer ends of the brushes to exert a constant bias urging the brushes into engagement with the commutator.

Summary of the invention

This invention relates to a miniature electric motor and more particularly to a brush holder means in a miniature electric motor.

An object of the present invention is to provide, in a miniature electric motor, a brush holder means having less electric resistance and therefore capable of conducting a greater amount of electric current to a commutator, said brush holder means having a novel construction such that it can be assembled easily and the electric contact between the carbon brushes, held in position in accordance with the present device, and the commutator of the motor may be maintained in an optimum state through the entire service life of the carbon brushes.

Another object of the present invention is to provide a novel detent means for a cover plate of the motor, carrying said brush holder means and adjusted to fit into the open end of the motor casing having the field magnet, armature and other parts enclosed within the interior thereof.

Brief description of the drawings

For an understanding of the principles of the invention, reference is made to the following description of typical embodiments thereof as illustrated in the accompanying drawings.

In the drawings:

FIG. 4 is a side elevation view showing another embodiment of the brush holder means, in a miniature electric motor, according to this invention;

FIG. 5 is an enlarged part side elevation and part sectional view illustrating the brush holder means of FIG. 4;

FIG. 6 is a side elevation view illustrating detent means on the motor casing for retaining the cover plate in the open end of the latter;

FIG. 7 is a partial side elevation view illustrating the cover plate secured in position by the detent means shown in FIG. 6; and FIG. 8 is a cross sectional view taken on the line VIII—VIII of FIG. 7.

Figure 1:
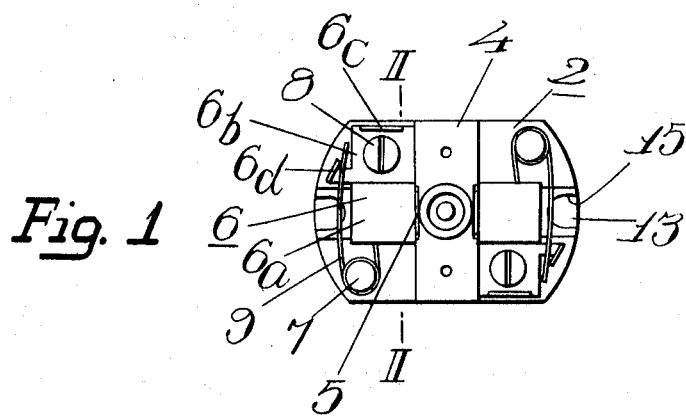
FIG. 1 is an end elevation view looking at the cover plate of one form of miniature electric motor embodying the invention.
Figure 2:
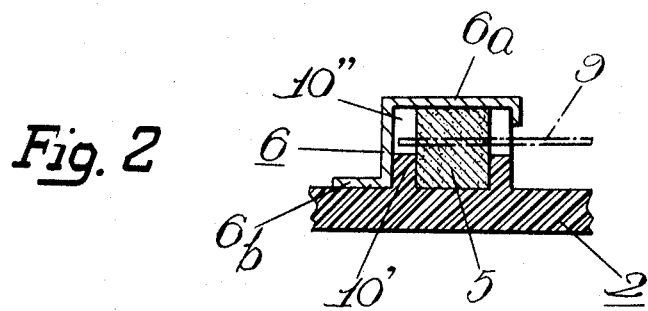
FIG. 2 is an enlarged partial sectional view, taken on the line II—II of FIG. 1.
Figure 3:
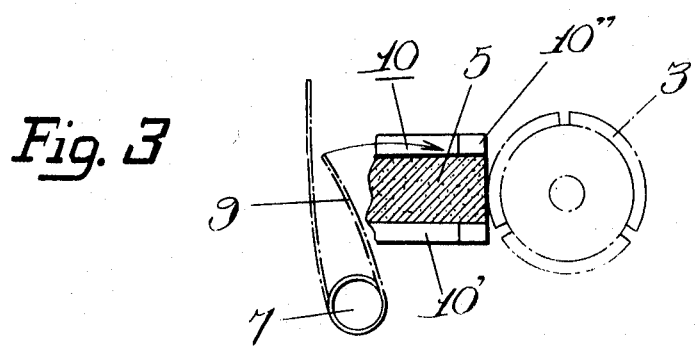
FIG. 3 is a part plan view, partly in section, corresponding to FIG. 2 with an electrically conductive plate omitted.

Referring to the drawings, especially to FIGS. 1, 2 and 3 thereof, a cover plate 2 made from dielectric or insulating material and fitted with brush holder means is attached to the open end of a motor casing 1 within which are accommodated the field magnet, the armature and its shaft, and other components of the motor. On the axially outer surface of cover plate 2, there is provided a bridge-like bearing 4 for rotatably supporting the armature shaft. Substantially rectilinear guide means 10 are provided on the outer surface of cover plate 2, these guide means extending radially toward the commutator 3 on the projecting end of the armature shaft, and serving to guide respective carbon brushes 5 into engagement with the commutator. Electrically conductive plates 6 engage the upper or outer lateral surface of carbon brushes 5 to supply electric current to the brushes, and torsion springs 9 are mounted on posts 7 and have arms engaging the radially outer ends of the brushes to exert a constant bias urging the associated brushes to engage commutator 3.

In the embodiment shown in FIGS. 1, 2, and 3, the respective guide means 10 guiding carbon brush oppositely towards the two lateral sides of the commutator comprise projecting ribs 10' formed integral with the cover plate 2 and each having an axially outwardly extending projection or abutment 10" at its inner end, as shown more particularly in the enlarged views of FIGS. 2 and 3. The arrangement is such that the carbon brush is pressed against the commutator, in the direction shown by the arrow of FIG. 3, by a torsion spring 9 which has an arm bearing against the radially outer end of the brush and exerts, at all times, an optimum bias urging the brush toward commutator 3 as the brush is worn down.

In the embodiments shown in FIGS. 4 and 5, each guide means 10 comprises a tubular guide member in the form of a split sleeve 11 having a pair of diametrically opposite slots 11'. Sleeve 11 is hexagonal in exterior contour and is formed of an electrically conductive material. Each sleeve 11 has a substantially square internal contour including a substantially square aperture through a closed radially inner end of the sleeve limiting the radially inward extension of the slots 11'. The slots 11' receive the arm of a torsion spring mounted on a post 7 on cover plate 2, this spring arm engaging the radially outer end of a brush 5 guided by the square inner contour of split sleeve 11, and each spring 9 constantly biases a brush 5 toward the commutator 3 with a substantially constant bias. As guide member or split sleeve 11 is not formed integrally with cover plate 2, its lower surface is seated in a conforming radially extending groove 12 on the outer surface of cover plate 2.

In both embodiments of the invention, electric current is supplied to the carbon brushes 5 by the electric conductive plates 6. In the embodiment of the invention shown in FIGS. 1, 2 and 3, each conductive plate 6 has a leg 6b secured to cover plate 2 by suitable means such as a screw 8, the outer end of leg 6b being formed with an upwardly extending portion 6c forming a lug to which current conducting wire can be secured. Each conducting plate 6 further has a portion 6a overlying and bearing against the outer lateral surface of the associated carbon brush 5, portion 6a having an extended surface contact with the associated brush. In addition, each conductive plate 6 is formed with a lug 6d retaining the opposite arm of the torsion spring 9.

In the embodiment of the invention shown in FIGS. 4 and 5, the electrically conductive split sleeve 11 has extensive surface engagement with lateral surfaces of the associated brush 5. In this embodiment of the invention, the portion 6a of the conducting plate 6 is roof-shaped to have conforming engagement with the outer lateral surface of the associated split sleeve 11, the conduction of electric current to the brush 5 thus being effected from conducting plate 6 through electrically conductive sleeve 11 to the brush 5. Otherwise, the conducting plate 6 is formed and secured in position in the same manner as described for the conducting plate 6 of FIGS. 1, 2 and 3.

The brush holder means is so constructed that the partial displacement or fluctuation of the carbon brushes and the fluctuation in the compressing force during the operation period, which have so often been the case with conventional carbon-brush device wherein a brush is mounted at one end of a supporting spring or resilient blade whose other end is secured by screws to the motor, and wherein the brush is pressed against the commutator only through the resilient force of the spring, may be prevented by virtue of the novel carbon-brush guide means attached to the motor. The carbon brushes are thus enabled to be pressed against the commutator with a uniform pressure at all times. While it is known that the electric resistance is in direct proportion with the length and in inverse proportion with the area of cross-section of the conductive material, the supply of electric current to the carbon brushes of the miniature electric motor according to the present invention is effected through the conducting plate 6 in direct or indirect contact with the carbon brush over a large cross-sectional area, so that the electric resistance is reduced considerably as compared with the current supply means in a conventional miniature motor, and consequently a large electric current may be supplied. In particular, the conducting plate in the embodiments shown in FIGS. 4 and 5, which indirectly contacts the brush through conductive sleeve 11, has the advantage of a larger conduction area than the plate 6 shown in the embodiment of FIGS. 1 to 3, and therefore has an increased electric conductivity. On the other hand, the guide means including the conducting plates 6 shown in FIGS. 1 to 3, has the advantage that it is much simpler in structure than the one shown in FIGS. 4 and 5 and may be produced at a lower cost. Needless to say, a variety of other modifications may be made from these two embodiments in accordance with the usages thereof and the present invention may include all of these possible modifications.

As shown in FIGS. 6, 7 and 8, the securing of cover plate 2 to motor casing 1 is effected by detent fingers 13 formed by cuts 14 in the open end of the motor casing, the detent fingers 13 thus formed being bent 90° to fit into grooves or notches 15 formed at corresponding positions on the cover plate 2. It will be noted that cover plate 2 has a reduced portion which can be telescopically inserted into casing 1, and has a larger diameter portion which rests against the open end of casing 1 to form a substantially smooth continuation of the external periphery of casing 1. Heretofore, in this type of miniature electric motor, a motor casing is formed, by pressing from sheet metal, with a flange portion bent 90° outwardly. Detent fingers are formed by cutting this flange to leave only small portions of the flange to form the detent fingers. In order to secure a cover plate to the casing, the detent fingers are bent 180° upwardly and inwardly, with the result that the life of the detent fingers is substantially reduced. Thus, it has often been the case that the detent fingers are fractured or damaged when the parts enclosed in the motor casing are to be interchanged or remedied. On the other hand, the detent fingers 13 in the miniature motor of the present invention are formed without initial bends, that is, flush with the wall of the motor casing, and need be bent only 90° in securing the cover plate to the motor casing, so that the service life of the detent fingers is remarkably prolonged.

Although description has been made of the embodiments of the present invention it is to be noted that the present invention is not limited to these embodiments but includes other structures coming within the scope of the invention defined in the appended claims.

What is claimed is:

1. A miniature electric motor comprising, in combination, a motor casing having an open end and formed to receive and rotatably support an armature shaft; a dielectric cover plate closing the open end of said casing and formed with a bearing rotatably supporting said armature shaft, with a commutator on said armature shaft extending axially outwardly of said cover plate; at least a pair of substantially rectilinear guide means on the outer surface of said cover plate extending radially toward said bearing; carbon brushes each slidably guided in a respective guide means for engagement of radially inner ends thereof with said commutator; respective electrically conductive plate means each having extended surface engagement with a lateral surface of a respective one of said brushes to supply electric current to said brushes; and respective springs each bearing on the radially outer end of a respective brush to exert a constant bias urging the associated brush to engage said commutator.

2. A miniature electric motor, as claimed in claim 1, in which said springs comprise torsion springs each having an arm bearing on the radially outer end of a respective brush.

3. A miniature electric motor, as claimed in claim 2, in which each guide means comprises a pair of laterally spaced substantially parallel and rectilinear ribs on the outer surface of said cover plate, each brush fitting between the ribs of a respective pair thereof.

4. A miniature electric motor, as claimed in claim 3, in which each rib has, at its radially inner end, an axially outwardly extending abutment limiting movement of the arm or the associated torsion spring in a radial inward direction.

5. A miniature electric motor, as claimed in claim 1, in which each guide means comprises an axially split electrically conductive sleeve having an interior contour conformingly receiving the associated brush, the axial split in each sleeve providing a pair of diametrically opposite slots receiving the arm of the associated torsion spring; said split sleeves being included in said electrically conductive plate means.

6. A miniature electric motor, as claimed in claim 5, in which each split sleeve is seated in a conforming radially extending groove in the outer surface of said cover plate.

7. A miniature electric motor, as claimed in claim 3, in which the height of said ribs is less than the thickness of the associated brush; said electrically conductive plate means comprising a bent electrically conductive plate secured to said cover plate and having a leg, of substantial area, overlying and bearing against the axially lateral surface of a brush.

8. A miniature electric motor, as claimed in claim 5, in which the external contour of said sleeves is hexagonal in end elevation; said electrically conductive plate means including respective electrically conductive plates each operatively associated with a respective split sleeve, each electrically conductive plate comprising a bent plate having a leg secured to the outer surface of said cover plate and a roof-shaped leg overlying and bearing against the axially outer surface of the associated split sleeve.

9. A miniature electric motor, as claimed in claim 1, including plural detent fingers at the open end of said casing and each defined by a pair of spaced cuts in the wall of said casing; said cover plate being formed with notches in its periphery at locations corresponding to said detent fingers and said detent fingers being bent to extend radially inwardly to engage in the respective notches to retain said cover plate assembled with said motor casing.

10. A miniature electric motor, as claimed in claim 9, in which said cover plate includes an axially inner portion fitting within the open end of said motor casing and formed with said notches, and an axially outer portion peripherally congruent with the external peripheral surface of said motor casing.

References Cited

UNITED STATES PATENTS

| 3,003,074 | 10/1961 | Finsterwalder | 310—239 |
| 3,095,515 | 6/1963 | Case et al. | 310—43 |
| 3,165,654 | 1/1965 | Mabuchi | 310—46 |
| 3,204,138 | 8/1965 | Mabuchi | 310—239 |

WARREN E. RAY, *Primary Examiner.*

U.S. Cl. X.R.

310—246